United States Patent

White

[15] 3,705,530
[45] Dec. 12, 1972

[54] FORCE HUB SENSOR FOR CONTROL WHEEL STEERING

[72] Inventor: Kenneth H. White, Marion, Iowa

[73] Assignee: Collins Radio Company, Cedar Rapids, Iowa

[22] Filed: Dec. 14, 1970

[21] Appl. No.: 97,556

[52] U.S. Cl. .............................................73/136 C
[51] Int. Cl. .................................................G01l 5/22
[58] Field of Search..............73/136 B, 136 C, 136 A

[56] References Cited

UNITED STATES PATENTS

| | | | |
|---|---|---|---|
| 1,204,292 | 11/1916 | McCormick | 73/136 A |
| 2,592,796 | 4/1952 | Doussain | 73/136 C |
| 2,403,952 | 7/1946 | Ruge | 73/136 C |
| 2,173,039 | 9/1939 | Muir | 73/136 C |

*Primary Examiner*—Jerry W. Myracle
*Attorney*—Richard W. Anderson and Robert J. Crawford

[57] ABSTRACT

A two-axis force sensor with minimal space requirements is constructed of concentric sleeve members between which a single ring-like elastic member provides a spring restrained coupling as to both relative rotation and axial translation between the sleeve members. Force readout means may comprise strain gauges attached to the coupling member per se or other transducer means responsive to relative motion between sleeves from rest position.

17 Claims, 6 Drawing Figures

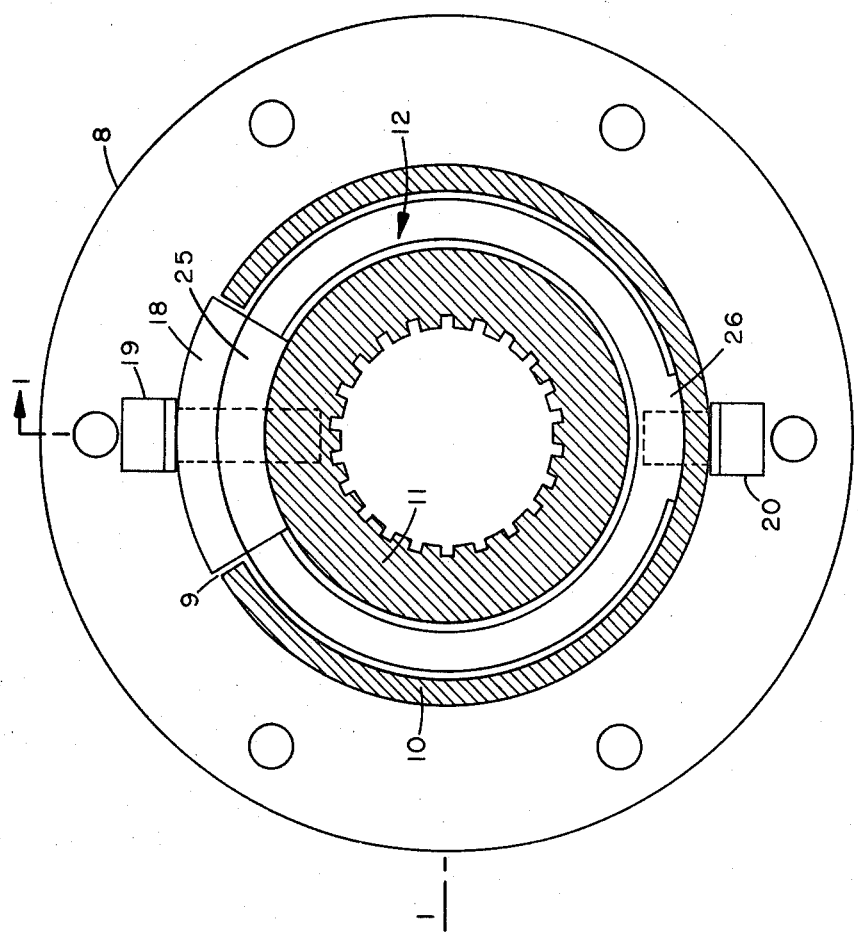
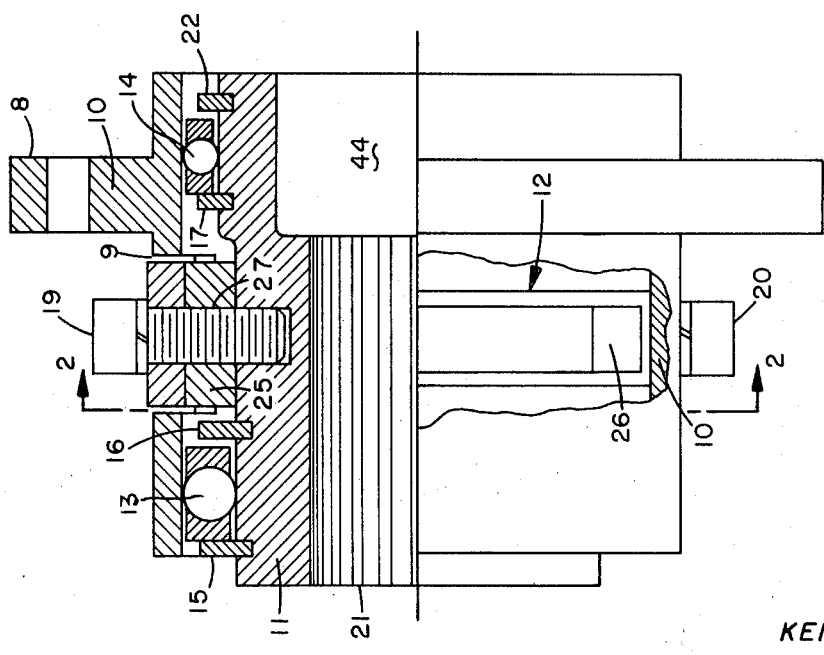
FIG. 2
FIG. 1
INVENTOR
KENNETH H. WHITE
BY R. W. Anderson
AGENT

INVENTOR
KENNETH H. WHITE

BY R. W. Anderson
AGENT

FORCE HUB SENSOR FOR CONTROL WHEEL STEERING

This invention relates generally to force sensing mechanisms and more particularly to an improved two-axis force sensor of a type which might be interposed between an aircraft control wheel and control system for the purpose of detecting pilot applied control forces.

The sensor of the present invention is especially useful for employment in an aircraft control system wherein pilot applied forces may be detected by electromechanical transducers for use in effecting aircraft control rates as a function of the forces applied.

For this purpose, two-axis sensors have been developed in the art by means of which the forces applied during pilot aileron control applied forces (bank) and the forces applied laterally in the form of elevator control forces (pitch) may be transduced into electrical signals for application to automatic control circuitry to command the aircraft elevator and aileron control systems in proportion therewith.

Known sensors to provide this function generally take the form of a coupling between the control wheel and the control column which permits limited relative rotation between the wheel and the column against a spring restraint and also limited lateral translation within the coupling against a further spring restraint. Strain gauges or displacement sensors associated with each of the spring restraining means may then be utilized to transduce applied forces into a proportional electrical control signal in either or both of the two axes under consideration.

Because force sensors of this type become a part of the primary control system of the aircraft, that is, they are actually a coupling between the control wheel and the control column, rigid strength requirements are set down in Federal Airworthiness Regulations which include maximum pilot control forces and a minimum factor of safety. In addition, upon failure of the spring restraining means employed in such devices, only a minimum amount of free play is permissible in the control system. Further, the application of forces beyond a predetermined threshold must establish a positive mechanical coupling between control wheel and column.

Because of the stringent regulations, known force sensors are generally appreciable in size and, as such, not readily compatible with the control wheel and control column dimensions of smaller aircraft. Particularly, the wheel hub of smaller aircraft is of a small diameter which does not permit integrating known force sensors within the confines of the hub proper.

It is accordingly an object of the present invention to provide an improved two-axis force sensor of a type which might be employed in aircraft control systems having minimal space requirements and may readily be installed within the control wheel hub or control column of smaller aircraft.

A further object of the present invention is to provide a two-axis force sensor of the type generally described above which is constructed of a minimum of coacting parts and which provides a positive, very rugged, mechanical stop upon application of forces to either of the control axes of a predetermined threshold.

The present invention is featured in first and second concentric sleeve members uniquely interconnected with a single spring member and a coacting mechanical limit means whereby deflection of the single spring member in the two axes under consideration may be readily detected to provide output sensors with indications of the forces exerted in either or both of the two axes.

These and other objects and features of the present invention will become apparent upon reading the following description with reference to the accompanying drawings in which:

FIG. 1 is a partial section plan view of a force sensor mechanism in accordance with the present invention.

FIG. 2 is a cross section detail of the force sensor.

As above-described, the mechanism of the present invention may be employed as an input member for a control wheel steering system in an aircraft. As such, the mechanism is interposed as a coupling between the control wheel and the control system to sense pilot applied elevator and aileron control forces.

It is highly advantageous for such sensors to be placed within the control wheel hub per se or, alternatively, as close to this location as good design practice permits, in order to avoid placing the control column inertia between the pilot and the sensor.

The transducer of the present invention lends itself to extreme compactness in design and thus is uniquely compatible with control wheel hub integrated installations. The sensor to be described consists generally of an inner sleeve member which might be coupled to the aircraft control column and an outer sleeve member which might be secured to the control wheel. The two sleeves are connected together by a single spring assembly for provision of force measurements within the range of interest defined by a particular control system, and are connected together by an extremely rugged stop assembly during application of force levels beyond the range of interest. Concentricity of the two sleeve members is established and maintained by a ball bearing assembly at each end of the force sensor assembly. Deflection of the spring in response to force application may be measured by one or both of strain gauge displacement pick-offs associated with the spring member as applicable, or, alternatively, other transducer expedients may be employed to respond to relative motion between the sleeve members.

Since the force sensor, as above-mentioned, is a part of the primary control system of the aircraft, the force sensor of the present invention permits a maximum spring stress far less than the yield strength of the elastic material from which the spring is embodied in order to assure improbability of an endurance failure.

If, however, a spring should break or fail, the sensor mechanism of the present invention couples control forces, as exerted by the pilot on the wheel, directly through the sensor in a manner which results in barely more than a detectable amount of free-play in the control system.

Figure 3:
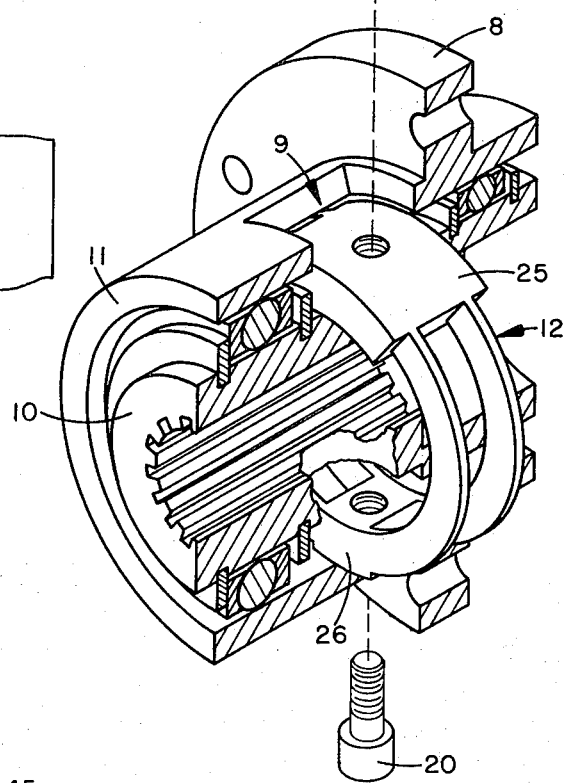
FIG. 3 is a functional isometric view of the interrelationship between the spring member and sleeve members of a sensor in accordance with the present invention.

With reference to FIGS. 1, 2, and 3, the force hub sensor in accordance with the present invention is comprised basically of a pair of concentric sleeve members the inner one of which may be coupled to the aircraft control column and the outer one of which may be secured to the control wheel. As will be further described, the mechanism of the present invention is readily adaptable for incorporation either within the hub of a given wheel, or, alternatively, as a separate coupling member in the control column. Because of the novel concentric relationship of all parts including the coupling spring member, the mechanism permits a wide range of installation flexiblity.

With reference to FIG. 1, inner sleeve member 11 is maintained concentrically within outer sleeve member 10 by first and second ball bearing assemblies 13 and 14 at each end of the sensor mechanism. Ball bearing assemblies 13 and 14 permit concentric rotation of one sleeve member with respect to the other, and, since the races associated with the ball bearing members 13 and 14 are flat, relative lateral displacement between the inner and outer sleeve members 11 and 10 is permissible. Retaining ring members 15 and 16 confine ball bearing means 13 while retainers 17 and 22 confine ball bearing assembly 14. These retaining means are seen to permit an axial displacement of the ball bearing mechanisms along the longitudinal axis of the assembly.

The inner sleeve member 11 and the outer sleeve member 10 are coupled together by a single spring assembly 12.

Figure 4:
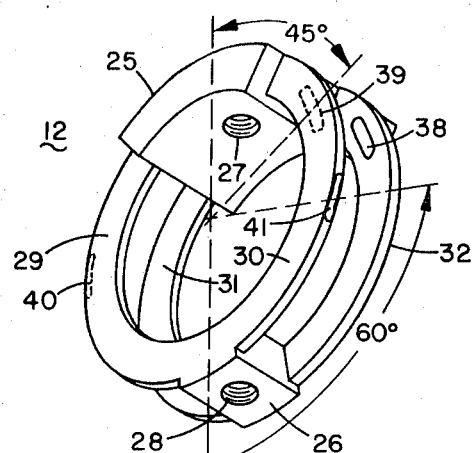
FIG. 4 illustrates the spring coupling and sensing means member of the present invention.

With reference to FIG. 4, spring assembly 12 is comprised of an upper mounting pad member 25 and a lower mounting pad member 26 integrally joined with annular ring-like segments. As illustrated, the particular spring embodiment depicted in FIG. 4 comprises a first pair of coplanar annular segments 29 and 30 and a second parallel spaced pair of coplanar annular segments 31 and 32 terminated by the diametrically opposed mounting pad members 25 and 26.

The annular coupling segments between the upper and lower mounting pads of the spring structure are of a finite thickness and width in accordance with predetermined mechanical deformation properties defined by spring material and configuration as desired for a particular embodiment. The undersides of both the top and bottom pad members are extended such that the upper mounting pad 25 has the same inner radius as the outer radius of inner sleeve member 11, while the lower pad member 26 has the same outer radius as the inner radius of the outer sleeve member 10. In assembled relationship, as depicted in FIGS. 1, 2, and 3, a first bolt member 20 may be threadedly received in the wall of the outer sleeve member 10 and into a threaded mounting hole 28 formed through the lower mounting pad member 26 of the spring, so as to rigidly affix the spring member to the inside wall of the outer cylinder 10. The outer radius face of the upper mounting pad member 27 is thus seen to be placed at a radius somewhat less than the inner radius of the outer sleeve member 10 and juxtaposed with a through-slot or aperture 9 formed through the outer sleeve wall. A stop member 18 having substantially the same configuration as the upper mounting pad 25 of the ring member 12 is provided with a mounting hole through which a bolt member 19 is receivable into threaded mounting hole 27 in the upper mounting pad 25 of the spring, and into threaded engagement with the inner sleeve member 11. Stop pad 18 is then rigidly affixed to the top pad 25 of the spring 12 and concentrically within the confines of the aperture 9 formed in the outer cylinder wall so as to permit, for example, a 0.010 inch movement from rest position both laterally and transversely of the axis of the assembly.

Figure 5:
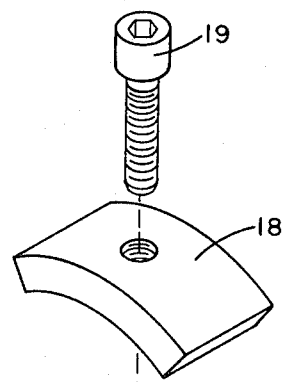
FIG. 5 is a mechanical detail of the interrelationship of the members effecting a positive mechanical limit.

As further illustrated in FIG. 5, the pad stop member 18 is seen to be confined within the aperture 9 formed in the outer sleeve member 10 such that 0.010 inch gaps 34–37 exist between stop member and aperture walls.

As depicted in FIG. 1, the inner cylinder member might be formed with a longitudinally extending bore 21 into which is machined a spline socket to accept a male spline formed on the control column. The outer sleeve member 10 might be formed with an annularly extending adapting flange 8 to facilitate coupling with the control wheel (not illustrated) such that the entire assembly is within the confines of the control wheel hub. It is noted for this particular application that the annular spring member 12 by means of which the inner and outer sleeves 11 and 10 are coupled and, as will be further described, by means of which the relative forces applied along two axes may be determined by sensing corresponding spring deflections, permits a compact arrangement with a splined coupling within the hub confines between the assembly and the control column.

The spring member 12 couples the inner and outer sleeve members 11 and 10 in a manner permitting relative sleeve rotation over a limited range while additionally permitting relative longitudinal translation between the two members. These two movements are imparted to the sensing mechanism by pilot applied forces to the wheel and against spring imparted restraints.

Over a designed range of input forces effecting relative sleeve rotation, the spring member 12 is caused to distort within a plane transverse to the longitudinal axis of the mechanism in the manner of a cantilever beam deforming against the restraint imposed by the control column load.

The application of pilot applied forces to the wheel for elevator control imparts a longitudinal force to the outer sleeve member against the longitudinal restraining force of the control column and thus effects a translation between the inner and outer sleeve members against the spring restraint. During such lateral displacement of the inner and outer sleeve members the annular coupling segments forming the spring member are imparted with a stress along an axis perpendicular to that of the aforedescribed force application, since the upper and lower mounting pads 27 and 26 associated with the spring assembly are displaced from their diametrically opposed unloaded position. Again with reference to FIG. 5, a distortion of the spring member along this axis is limited by one or the other of the sides of the stop member 18 engaging a surface of the through slot 9 in outer sleeve member 10.

FIG. 2 illustrates the concentric sleeve members in their assembled relationship with the spring assembly 12 and indicates that clearance is readily provided for spring distortion in response to relative rotation between the sleeve members within the limits defined by the aperture 9 formed in the outer sleeve 10 and the stop member 18.

The assembly thus provides a means for coupling concentric sleeve members in a manner permitting limited translational as well as rotational movements between the two sleeves and, in addition, in a manner establishing a rest position from which the limited relative movements are restrained. Since the coupling member between the two sleeves is a spring member, the spring material and dimensions establish a predetermined relationship between the relative translational and rotational movements between the two sleeves and the force applied to effect these movements. As such, transducer means may be employed to detect the relative sleeve member motions both in sense and magnitude from the established rest position of the sleeves.

As illustrated in FIG. 4, strain gauge transducers 38 and 39 might be mounted on the radially extending surfaces of arcuate spring segments 30 and 32 to be utilized in appropriate circuit for detecting forces effecting relative sleeve translation. These members may be attached to the annular segments at points approximately one-fourth (angle-wise) from either of the respective spring anchor points established by spring mounting pad members 27 and 26. This expedient is employed since the cantilever-like action of the spring member, as it distorts in response to axial loading between the sleeves, establishes a neutral axis approximately midway between the spring anchor points. As illustrated in FIG. 4, the strain gauges 39 and 38 are mounted anglewise 45° down from the location of the upper spring mounting hole 27 to avoid a neutral axis midway between mounting points.

A further pair of strain gauges 40 and 41 may be mounted on the outer diameter surfaces of the arcuate spring segments. As depicted in FIG. 4, gauges 40 and 41 might preferably be mounted on symmetrically opposite coplanar ones of the arcuate spring segments at points (in order to avoid a neutral axis) one-third (angle-wise) from the bottom mounting point established by pad 26.

Spring member 12 as described and illustrated herein is comprised of a first pair of coplanar arcuate coupling segments paralleled with a second such pair between upper and lower mounting pads. A single such pair or a plurality of pairs of coplanar segments might be employed. The particular configuration is based solely on the design criteria for a given embodiment in terms of type of elastic material employed, the maximum stresses to be imparted, the safety factors as against spring failure to be considered, etc. In a general sense the spring member is comprised of a cantilever beam member embodied as a ring.

Figure 6:
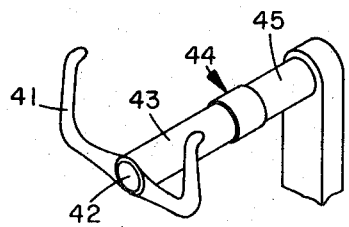
FIG. 6 is a diagrammatic representation of an aircraft control wheel and column with functional inclusion of a force sensor as described in the present invention.

FIG. 6 functionally depicts an aircraft control wheel 41 including a hub portion 42 attached to a control column 43 wherein a force sensor mechanism 44 in accordance with the present invention may be interconnected as a coupling member in the column per se, in which case the section of the column 43 attached to the wheel hub 42 would affix to the outer sleeve member 10 of the sensor and the control column portion leading to the aircraft control system would be affixed to the inner sleeve member 11 of the mechanism. It is to be understood that in this type of application the outer and inner sleeve members may be formed with any desired coupling terminations to mate with the column cross sections. In a most advantageous sense the formation of a coupling ring on the outer sleeve which may be mated to the hub per se of a control wheel (FIG. 1) is preferred because of the desirability of mounting the force sensor as close to the pilot applied forces as possible to include as little as possible of the control column and yoke assembly inertia between the point of force application and the location of the sensor with which these forces are detected.

The present invention is thus seen to provide a compact force sensing mechanism of a dual axis type which is comprised of a minimal number of parts and includes a novel unitary spring coupling and sensing assembly.

Although the present invention has been described with respect to particular embodiments thereof, it is not to be so limited as changes might be made therein which fall within the scope of the invention as defined in the appended claims.

I claim:

1. In combination with first and second concentric sleeve members, the inside diameter of the outer one of said sleeve members exceeding the outside diameter of the inner one of said sleeve members, means for establishing a predetermined force to mechanical displacement ratio between said first and second concentric sleeve members, comprising bearing means communicating with said sleeve members and mounted therebetween, said bearing means maintaining concentricity between said first and second sleeve members and permitting both relative rotation about a rotational axis common to said sleeve members and axial translation between said sleeve members along said rotational axis, an annular ring-like elastic member carried within the radial space between said first and second sleeve members, said first and second sleeve members having respective radial dimensions establishing a predetermined radial clearance between said elastic member and each of said sleeve members, said elastic member communicating with first and second diametrically opposed mounting surfaces, said mounting surfaces having respective radial dimensions establishing juxtaposition of one of said mounting surfaces with the outer surface of said inner sleeve member and the other of said mounting surfaces with the inside surface of said outer sleeve member while maintaining concentricity between said elastic member and said sleeve members, and means for rigidly affixing said elastic member mounting surfaces with said respective juxtaposed ones of said inner and outer sleeve member surfaces, whereby said relative rotation and axial translation between said first and second sleeve members is effected against predetermined restraints imposed by the geometry and resilient characteristics of said elastic member.

2. Means as defined in claim 1 wherein said elastic member comprises at least one pair of coplanar annular segments terminated in said first and second mounting surfaces, each of said segments being rectangular in cross section and having a radially extending dimension generally in excess of the thickness thereof.

3. Means as defined in claim 1 further comprising mechanical stop means associated with said inner sleeve member and cooperating with mechanical stop limit means associated with said outer sleeve member to establish predetermined maximum relative rotation and relative translation limits between said first and second sleeve members.

4. Means as defined in claim 3 wherein said mechanical stop means comprises a through-aperture formed in said outer sleeve member and generally juxtaposed with a first one of said mounting surfaces associated with said elastic member, the radial dimension of first elastic member mounting surface being extended to project within the confines of said through-aperture to establish a predetermined clearance between the extreme dimensions of surface extension and the radially extending walls of said through-aperture, whereby application of forces in response to which predetermined rotational and translational limits are exceeded between said first and second sleeve members effects an abutting communication between said mounting member extension and the walls of said through-aperture.

5. Means as defined in claim 1 wherein said elastic member comprises a paralleled plurality of coplanar pairs of said annular segments.

6. Means as defined in claim 5 wherein said elastic member and the first and second mounting surfaces associated therewith are integrally formed from a common elastic material.

7. In combination with first and second concentric sleeve members, means for measuring forces applied to effect relative rotation about a rotational axis common to said sleeve members and axial translation of said first sleeve member with respect to said second sleeve member along said rotational axis comprising means for mounting said second sleeve member concentrically within said first sleeve member, said means for mounting establishing a spaced relationship between said sleeve members and permitting relative rotation and axial translation therebetween, said second sleeve member being connected to a mechanical load presenting predetermined forces resisting said rotation and axial translation between said sleeve members, an annular ring-like elastic member carried transverse the longitudinal axes of said sleeve members and within the radial space therebetween and having dimensions establishing radial clearance with said respective sleeve members, said elastic member communicating with first and second diametrically opposed mounting surfaces the respective radial dimensions of which permit juxtaposition of one of said mounting surfaces with the outer surface of said inner sleeve member and of the other of said mounting surfaces with the inside surface of said outer sleeve member while maintaining concentricity between said elastic member and said first and second sleeve members, means for rigidly affixing said mounting surfaces with said respective juxtaposed ones of said inner and outer sleeve member surfaces whereby application of forces to said first sleeve member effecting relative rotation between said sleeve members and axial translation between said sleeve members against the restraints of said elastic member bear a predetermined applied force-to-mechanical displacement ratio defined by the geometry and resilient characteristics of said elastic member, and transducer means responsive to relative rotation and translation between said sleeve members to establish first and second output signals respectively proportional to said relative rotation and translation.

8. Means as defined in claim 7 wherein said transducer means comprises respective strain gauge means mounted on said elastic member.

9. Means as defined in claim 7 wherein said elastic member comprises at least one pair of coplanar annular segments terminated in said first and second mounting surfaces, each of said segments being rectangular in cross section and having a radially extending dimension generally in excess of the thickness thereof.

10. Means as defined in claim 7 wherein said elastic member comprises a paralleled plurality of coplanar pairs of said annular segments.

11. Means as defined in claim 7 further comprising mechanical stop means associated with said inner sleeve member and cooperating with mechanical stop limit means associated with said outer sleeve member to establish predetermined maximum relative rotation and relative translation limits between said first and second sleeve members.

12. Means as defined in claim 11 wherein said mechanical stop means comprises a through-aperture formed in said outer sleeve member and generally juxtaposed with a first one of said mounting surfaces associated with said elastic member, the radial dimension of first elastic member mounting surface being extended to project within the confines of said through-aperture to establish a predetermined clearance between the extreme dimensions of surface extension and the radially extending walls of said through-aperture, whereby application of forces in response to which predetermined rotational and translational limits are exceeded between said first and second sleeve members effects an abutting communication between said mounting member extension and the walls of said through-aperture.

13. Means as defined in claim 12 wherein said transducer means comprises respective strain gauge means mounted on said elastic member.

14. Means as defined in claim 12 wherein said elastic member comprises at least one pair of coplanar annular segments terminated in said first and second mounting surfaces, each of said segments being rectangular in cross section and having a radially extending dimension generally in excess of the thickness thereof.

15. Means as defined in claim 14 wherein said elastic member and the first and second mounting surfaces associated therewith are integrally formed from a common elastic material.

16. Means as defined in claim 12 wherein said elastic member comprises a paralleled plurality of coplanar pairs of said annular segments.

17. Means as defined in claim 16 wherein said elastic member and the first and second mounting surfaces associated therewith are integrally formed from a common elastic material.

* * * * *